United States Patent
Tarabzouni (10) Patent No.: US 12,066,138 B2
(45) Date of Patent: Aug. 20, 2024

(54) SEALANT INJECTION SYSTEM FOR SCRAPER TRAP DOOR

(71) Applicant: SAUDI ARABIAN OIL COMPANY, Dhahran (SA)

(72) Inventor: Mohanned Tarabzouni, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 445 days.

(21) Appl. No.: 17/650,626

(22) Filed: Feb. 10, 2022

(65) Prior Publication Data

US 2023/0250913 A1 Aug. 10, 2023

(51) Int. Cl.
| | |
|---|---|
| *F16L 55/46* | (2006.01) |
| *F16L 55/10* | (2006.01) |
| *F16L 55/175* | (2006.01) |
| *G01M 3/00* | (2006.01) |

(52) U.S. Cl.
CPC ......... *F16L 55/175* (2013.01); *F16L 55/1018* (2013.01); *F16L 55/46* (2013.01); *G01M 3/00* (2013.01); *F16L 2201/30* (2013.01)

(58) Field of Classification Search
CPC ..... F16L 55/175; F16L 55/1018; F16L 55/46; G01M 3/00
See application file for complete search history.

(56) References Cited

U.S. PATENT DOCUMENTS

| | | | |
|---|---|---|---|
| 4,237,936 A | 12/1980 | Lollis et al. | |
| 6,022,421 A * | 2/2000 | Bath | B08B 9/055 |
| | | | 15/104.062 |
| 8,800,584 B2 * | 8/2014 | McNabney | F16L 55/46 |
| | | | 15/104.062 |
| 9,052,049 B2 | 6/2015 | Pargmann | |
| 10,525,511 B2 | 1/2020 | Long | |
| 2010/0170535 A1 * | 7/2010 | Freeman | F16L 55/38 |
| | | | 15/104.062 |

(Continued)

FOREIGN PATENT DOCUMENTS

| | | |
|---|---|---|
| EP | 0126648 A2 | 11/1984 |
| WO | 2020202134 A1 | 10/2020 |

OTHER PUBLICATIONS

"Failure Investigation Report—Pig Trap Gas Release—Activity ID 127555", Feb. 9, 2022; pp. 1-17; Retrieved from the Internet: URL: https://www.phmsa.dot.gov/sites/phmsa.dot.gov/files/docs/Hampshire_Gas%20GT%20WV%20508%202009-03-24.pdf (17 pages).

(Continued)

*Primary Examiner* — Kevin R Barss
(74) *Attorney, Agent, or Firm* — Osha Bergman Watanabe & Burton LLP (57) ABSTRACT

A scraper launcher includes a body having a rim and a trap door having a first surface and a second surface, where an interfacing portion of the second surface interfaces with an interfacing surface of the rim when the trap door is closed against the rim. A seal is provided between the interfacing portion of the trap door and the interfacing surface of the rim. The scraper launcher also includes a sealant injection system with sealant passages formed through the scraper launcher, fluidly communicating an exterior of the scraper launcher to an interior of the scraper launcher, and an injection fitting in communication with the sealant passages.

20 Claims, 6 Drawing Sheets

(56) References Cited

U.S. PATENT DOCUMENTS

| | | | | |
|---|---|---|---|---|
| 2011/0174387 A1* | 7/2011 | Olivier | ............... | B66F 7/0625 |
| | | | | 15/104.062 |
| 2012/0234422 A1* | 9/2012 | Pargmann | ............... | F16L 55/46 |
| | | | | 138/89 |
| 2016/0169436 A1* | 6/2016 | Sander | ............... | B08B 9/055 |
| | | | | 15/104.062 |
| 2016/0369934 A1* | 12/2016 | Penza | ............... | F16J 15/168 |
| 2017/0089502 A1* | 3/2017 | Genta | ............... | B66F 7/065 |
| 2017/0113426 A1 | 4/2017 | Mainzer | | |

OTHER PUBLICATIONS

"A Stable & Fast Operating Door for Use With Pipelines and Launchers / Receivers of Various Diameters", PC2000-205; The American Society of Mechanical Engineers; Oct. 21, 2016; pp. 867-888 (22 pages).

Dr. A Palmer & T Jee, "Why Pig a Pipeline?"; Pipeline Pigging Technology, 2nd Edition; Butterworth-Heinemann; Chapter 1; 1999; pp. 3-15 (13 pages).

J L Cordell, "On-Line Inspection Techniques: Available Technology"; Pipeline Pigging Technology, 2nd Edition; Butterworth-Heinemann; Chapter 1; 1999; pp. 17-30 (14 pages).

Office Action issued by Saudi Arabian Patent Office for Saudi Arabian patent application No. 123441164, mailed Mar. 30, 2024 (11 pages).

* cited by examiner

SEALANT INJECTION SYSTEM FOR SCRAPER TRAP DOOR

FIELD OF DISCLOSURE

Embodiments disclosed herein relate generally to oil and gas pipeline equipment. More particularly, embodiments disclosed herein relate to a sealant injection system to prevent leaks in a closure or trap door of a scraper or pig launcher.

BACKGROUND

Pipelines are one of the main elements of the oil and gas infrastructure. It acts as the main transportation system for all kinds of energy products, natural gas, biofuels, and liquid petroleum. There are two main types of materials in which the pipelines are made of metal, such as steel, or non-metal, such as plastic. Both kinds of pipelines serve the same purpose, however, steel pipelines are the type commonly used worldwide. The pipelines serve three main purposes: gathering lines, which bring crude oil or natural gas from nearby wells to a treatment plant or processing facility, transportation pipelines that transit the outcome products like oil, gas, and refined product between cities or countries, and distribution pipelines which convey the products to the end users.

However, the pipelines may become clogged and have a buildup of debris resulting in pipeline damages and leaks leading to costly repairs, increased non-productive time (NPT), environmental hazards, and unsafe work conditions. To avoid the pipelines becoming clogged or having debris, cleaning operations are conducted on the pipelines. A cleaning device, such as a scraper (interchangeably referred to as a pig), may be sent through the pipeline for cleaning, monitoring, and maintaining of the pipeline. For example, a scraper launcher (interchangeably referred to as a pig launcher) attached to the pipeline may use pressure to launch the scraper through the pipeline. Scrapers can be launched into pipelines by providing a scraper launcher at multiple points along the pipeline, at which the scraper will be inserted and launched into the pipelines. A common issue in conventional scraper launchers is leaks in the trap door which can cause pipeline shutdown, costly valve emergency repair, and catastrophic events in the case of hydrocarbons release or fires. This can occur when the trap door is damaged, defected, or improperly closed. For example, leaks from the trap door may be due to damaged door and seals or defected isolation valves.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, the embodiments disclosed herein relate to a scraper launcher. The scraper launcher may include a body having a rim and a trap door having an interfacing portion that interfaces with an interfacing surface of the rim when the trap door is closed against the rim. A seal may be provided between the interfacing portion of the trap door and the interfacing surface of the rim. The scraper launcher may further include a sealant injection system. The sealant injection system may include sealant passages formed through the scraper launcher, fluidly communicating an exterior of the scraper launcher to an interior of the scraper launcher and an injection fitting in communication with the sealant passages.

In another aspect, the embodiments disclosed herein relate to a trap door of a scraper launcher. The trap door may include a first surface; a second surface opposite the first surface; a seal disposed within a circumferential groove formed around the second surface; a hole formed through the thickness of the trap door, extending from the first surface to the second surface; an injection fitting coupled to the hole; and a groove extending a depth into the trap door from the second surface, wherein the hole is in fluid communication with the groove.

In yet another aspect, the embodiments disclosed herein relate to a method that may include detecting a leak of fluids from a trap door of a scraper launcher; injecting a sealant compound, with an injection fitting, into a groove formed between an interface between the trap door a body of the scraper launcher; and stopping the leak of fluids with a barrier formed from the injected sealant compound.

Other aspects and advantages will be apparent from the following description and the appended claims.

DETAILED DESCRIPTION

Embodiments of the present disclosure are described below in detail with reference to the accompanying figures. Like elements in the various figures may be denoted by like reference numerals for consistency. Further, in the following detailed description, numerous specific details are set forth in order to provide a more thorough understanding of the claimed subject matter. However, it will be apparent to one having ordinary skill in the art that the embodiments described may be practiced without these specific details. In other instances, well-known features have not been described in detail to avoid unnecessarily complicating the description. As used herein, the term "coupled" or "coupled to" or "connected" or "connected to" "attached" or "attached to" may indicate establishing either a direct or indirect connection, and is not limited to either unless expressly referenced as such. Wherever possible, like or identical reference numerals are used in the figures to identify common or the same elements. The figures are not necessarily to scale and certain features and certain views of the figures may be shown exaggerated in scale for purposes of clarification.

Further, embodiments disclosed herein are described using the term scraper, which may also be referred to in the industry as a pig. A scraper refers to a tool that may slide along an internal wall of a pipeline and remove adhered corrosion and other undesired substances. For example, a scraper may include a device with blades or brushes extending a diameter corresponding to an inner diameter of the pipeline to be cleaned. Pressure from within the pipeline may be used to push the scraper through the pipeline, where the blades or brushes may scrape rust, wax, scale, or other debris from the inner diameter of the pipeline.

In addition, a scraper launcher refers to an equipment assembly that may be connected to a pipeline and used to launch a scraper into a connected pipeline. Scraper launchers may also be referred to in the industry as scraper traps or pig launchers. Scraper launchers may often be located at terminal points of a pipeline and at compressor stations along the pipeline for launching and retrieving scrapers. A scraper launcher may include a trap door, which may be opened to allow the scraper to be inserted, and then the trap door may be closed to launch the scraper into the pipeline for cleaning operations. It is recognized by the different embodiments described herein that a scraper launcher plays a valuable and useful role in the life of a pipeline. By using methods and assemblies according to embodiments of the present disclosure, which may provide additional sealing around a trap door in a scraper launcher, fluids may be prevented from leaking around the trap door. As used herein, fluids may refer to slurries, liquids, gases, and/or mixtures thereof. The embodiments are described merely as examples of useful applications, which are not limited to any specific details of the embodiments herein.

In one aspect, embodiments disclosed herein relate to a sealant injection system for a trap door of a scraper launcher. A sealant injection system according to embodiments of the present disclosure may be used to inject sealant compounds around a trap door to stop fluid from leaking out the trap door and prevent pipeline shutdowns due to leaking trap doors. A sealant injection system may include sealant passages formed through a scraper launcher (e.g., through the trap door of the scraper launcher or through the body of the scraper launcher) and one or more injection fittings provided with the scraper launcher for directing sealant through the sealant passages. For example, one or more grooves may be provided on the trap door or on the body of a scraper launcher proximate the trap door for containing sealant to seal between the trap door and body of the scraper launcher, and one or more holes fluidly connected to the groove(s) may be provided through the scraper launcher to direct the sealant to the groove(s). One or more injection fittings may be attached at the openings of the hole(s), where the injection fitting(s) may inject sealant through the hole(s) and to the groove(s). The sealant compounds, once injected, will fill the groove(s) to cover any damages or scratches which may cause external leaks around the trap door. Additionally, each injection fitting may include a check valve, which may prevent backflow of the sealant compounds through the injection fitting after injection.

Overall, the sealant injection system as described may prevent pipeline shutdowns, stop leaks, minimize product engineering, minimize risk associated with pipeline and scraper launcher repairs, reduce assembly time, and reduce hardware cost. Additionally, using a sealant injection system according to embodiments of the present disclosure may result in a safe line of defense to operate and replace the seal at a later stage without being exposed to pipeline medium leakage, improved performance, leak mitigation, and reduction in operational costs associated with damaged or defected trap doors of a scraper launcher.

Figure 1:
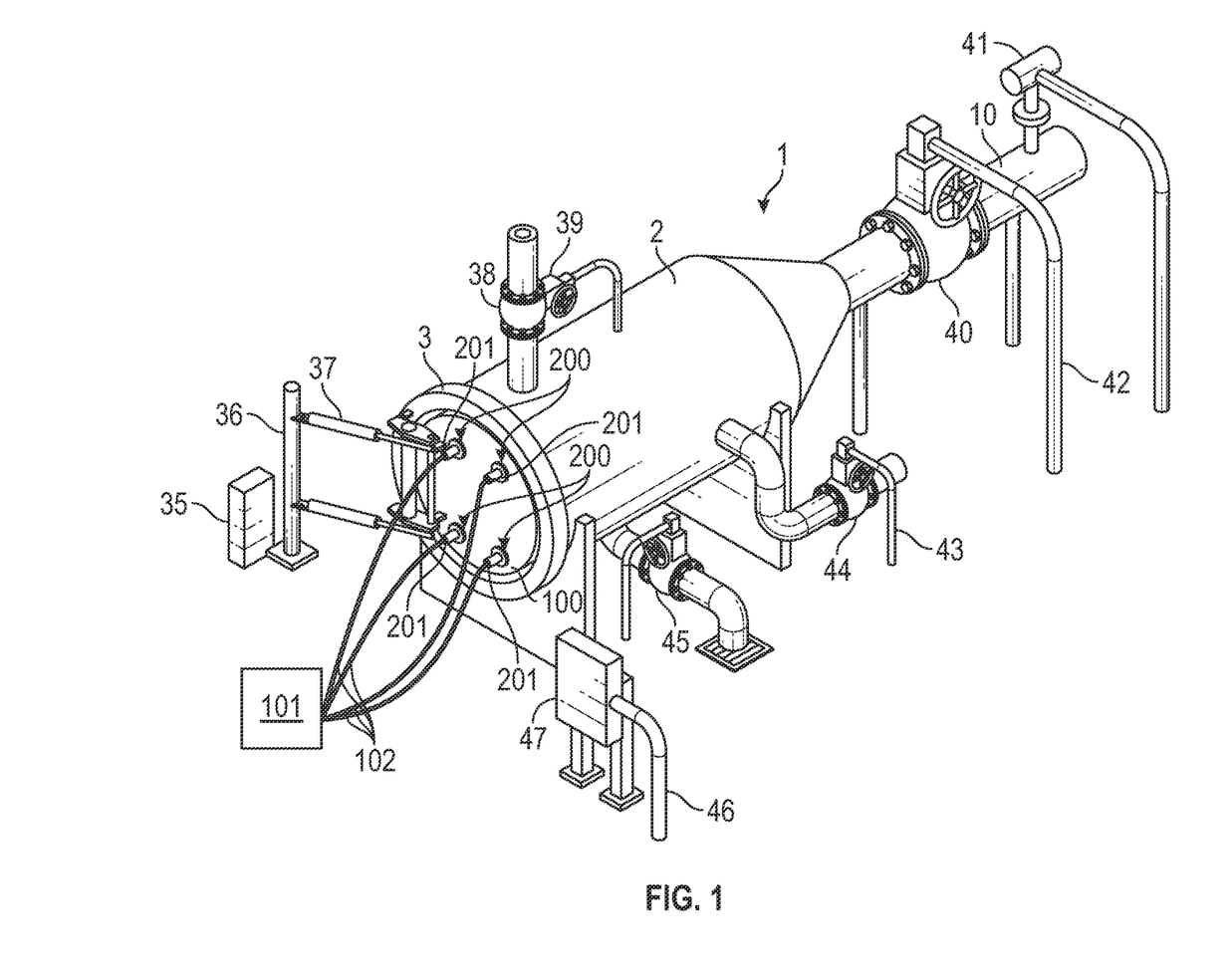
FIG. 1 is a perspective view of an example of a scraper launcher in accordance with one or more embodiments of the present disclosure.

FIG. 1 shows an example of a scraper launcher having a sealant injection system in accordance with embodiments of the present disclosure. However, other configurations of scraper launchers may have sealant injection systems incorporated according to embodiments of the present disclosure. A non-limiting example of a scraper launcher may be described in U.S. Pat. No. 10,955,082, the entire teachings of which are incorporated herein by reference. It is further envisioned that a trap door and sealant injection system disclosed herein may be used on any scraper launcher or receiver in the art As shown by FIG. 1, a scraper launcher 1 can include a trap door 100, a door opener support pole 36, an electro-hydraulic unit 35, and a local ground controller 47 (for example, operated by the computing system described in FIG. 9). The trap door 100 can be opened to insert a scraper into a body 2 of the scraper launcher 1 at one end of a pipeline 10. The body 2 may include a rim 3 for the trap door 100 to seal against. The rim 3 may be an integral portion of the body 2 or may be a separate element connected to the body 2, where the rim 3 forms an axial end of the body 2 on which the trap door 100 may close against. Hydraulic pistons 37, each of which is connected on one end to the trap door 48 and the other end pivoting on a hinge attached to the supporting pole 36, may be used to open and close the trap door 100. The hydraulic arms are powered by the hydraulic unit 35 and controlled by the local controller 47. While a hydraulic opening system for opening and closing the trap door 100 to the scraper launcher 1 is shown in the example of FIG. 1, other systems may be used to open and close a trap door of a scraper launcher, for example, a crank system.

Additionally, a controller may be used for other operating functions of a scraper launcher in addition to or alternative to opening/closing a trap door. For example, in FIG. 1, the local ground controller 47 can be connected to a command and power wiring conduit 46 through which wires can be passed to connect the controller 47 to multiple position switches (for example, a first position switch 39, a second position switch 42, a third position switch 43, or more or fewer position switches). The wires can also connect the controller 47 to multiple command-associated valves (for example, a first valve 38, a second valve 40, a third valve 44, a fourth valve 45, or more or fewer valves). The controller 47 is also connected to a pressure sensor/transmitter 41, which, in turn, is connected to the pipeline. The pressure sensor/transmitter 41 can sense a pressure in the pipeline and transmit the pressure, for example, as a current or voltage signal, to the controller 47.

A sealant injection system according to embodiments of the present disclosure may be integrated into a trap door 100 of a scraper launcher 1. For example, in one or more embodiments, the trap door 100 includes one or more sealant injection assemblies 200 assembled to the trap door 100 proximate the outer perimeter of the trap door 100. In the example shown in FIG. 1, four sealant injection assemblies 200 may be radially spaced apart from each other on the trap door 100. While only four sealant injection assemblies 200 are shown, this is for example purposes only, and any number of sealant injection systems may be used without departing from the scope of the present disclosure.

In some embodiments, each of the one or more sealant injection assemblies 200 includes an injection fitting 201 inserted in a hole drilled through the trap door 100, where the hole may be fluidly connected to one or more grooves formed between an interface between the trap door 100 and body 2 (e.g., along the rim 3) of the scraper launcher 1. An injector 101 or pump may be used to inject a sealant compound through the injection fitting 201 and into one or more fluidly connected grooves. The sealant compound may be a heavy body cavity sealant such as sealants made of a mixture of modified and/or blended oils and polytetrafluoroethylene (PTFE) (e.g., Sealweld Chameleon Sealant™ or South Coast Desco 115 TFE sealant). In the embodiment shown, the injector 101 may include a pump and a sealant compound source (e.g., a chamber filled with the sealant compound). In some embodiments, a sealant compound source may be provided in a chamber or device separate from a pump, where the pump may be fluidly connected to the sealant compound via hoses. Additionally, hoses 102 may be used to fluidly couple the injector 101 to the injection fitting 201. Further, the injector 101 may be stationary or handheld.

If a leak is detected, the injector 101 may automatically or manually inject the sealant compound through the injection fitting 201 to form a barrier within the scraper launcher 1 between the trap door 100 and the rim 3 of the scraper launcher. For example, a plant leak detection system, a sensor (e.g., an infrared device) on or within the scraper launcher 1, or manual inspection may be used for detecting fluid leaks (e.g., hydrocarbon liquid or gas leaking from the scraper launcher) and include commands to automatically operate the injector 101 to start injecting the sealant compound to seal the trap door 100.

Figure 2:
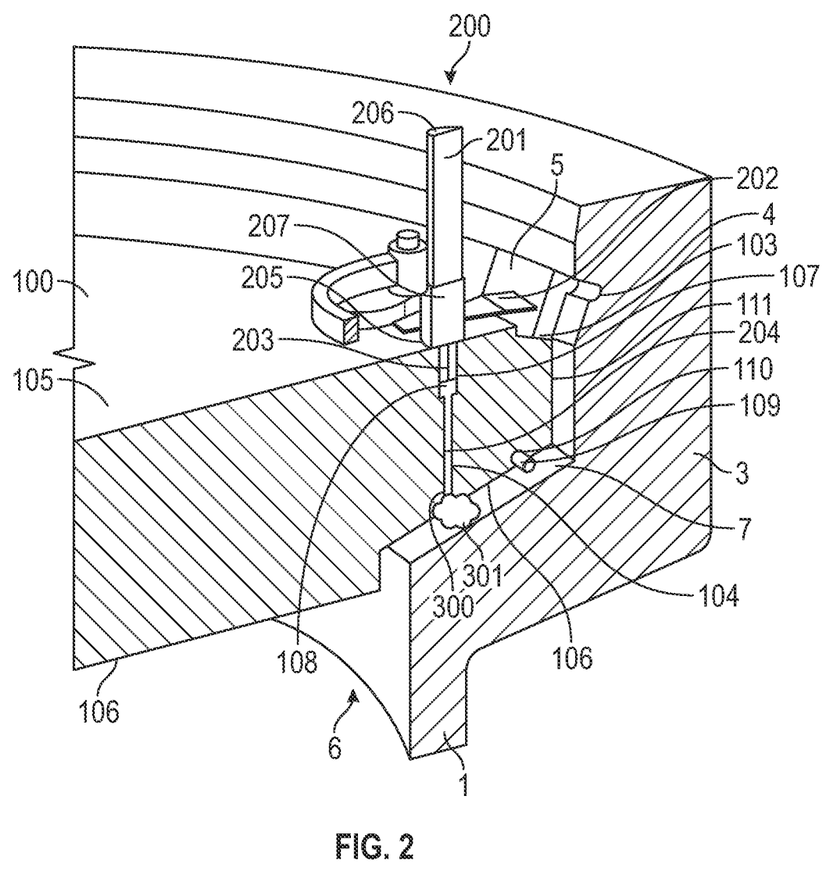
FIGS. 2 and 3 are perspective cross-sectional views of the scraper launcher of FIG. 1 in accordance with one or more embodiments of the present disclosure.

Turning to FIG. 2, a perspective cross-sectional view of the trap door 100 taken along the one or more sealant injection systems 200 of FIG. 1 is illustrated in accordance with one or more embodiments of the present disclosure. The trap door 100 has a thickness measured between a first surface 105 facing exterior to the scraper launcher and a second surface 106 facing the interior of the scraper launcher when the trap door 100 is closed. FIG. 2 shows the trap door 100 in a closed position to seal against an interfacing surface of the rim 3, where locking elements may be used to lock the trap door 100 in the closed position. For example, as shown, in the closed position, a tapered surface 103 of the trap door 100 forces a locking ring 5 into an inner groove 4 of the rim 3. The locking ring 5 may be a segmented lock ring. The locking ring 5 is locked by a lock disc insert 202, which may or may not be attached to the injection fitting 201. In some embodiments, when the injection fitting 201 is inserted into a hole 104, a lock disc insert 202 extending between the injection fitting 201 and the locking ring 5 may restrict the locking ring 5 between the tapered surface 103 of the trap door and the inner groove 4 of the rim. In this locked position, the locking ring 5 is prohibited from contracting and keeps the trap door 100 closed. Other locking systems may be used to keep the trap door 100 in the closed positioned against the rim 3 of the scraper launcher (e.g., clamps, latches, or other types of locking mechanisms).

In one or more embodiments, the injection fitting 201 may be inserted into the hole 104 in the trap door 100. The injection fitting 201 may include a hose connection end 206, to which a hose (see 102 in FIG. 1) may be attached to provide sealant through the injection fitting 201, and an injection end, through which sealant may be ejected out of the injection fitting 201. When inserted into a hole 104, the hose connection end 206 of the injection fitting 201 may be distal to the trap door 100, and the injection end may be inserted inside the hole 104. In some embodiments, the injection fitting 201 may have a threaded portion 203 coupled to a threaded portion 107 of the hole 104 such that a nozzle 204 at the injection end of the injection fitting 201 is held within the hole 104. The threaded portions 107, 203 may include any type of threads, such as ACME threads, API (American Petroleum Institute) threads, or specialty threads.

In some embodiments, an injection fitting 201 may have a check valve 207 provided within a flow path through the injection fitting body, between the connection end 206 and the injection end. The check valve 207 may be oriented along the injection fitting to allow the sealant compound to flow through the flow path in a direction from the connection end 206 to the nozzle 204 while preventing flowback of the sealant compound in the opposite direction.

Different sealing mechanisms may be used to seal the injection fitting 201 to hole 104. For example, the injection fitting 201 may include a sealing gasket 205 to seal the injection fitting 201 in the hole 104. Additionally, the hole 104 may include a relief groove 108 at the end of the threaded portion 107.

One skilled in the art will appreciate how, in some embodiments, the injection fitting 201 may have a pressure release allowing a volume of pressurized gasses within the scraper launcher 1 to escape. One skilled in the art will also appreciate how other locking and pressure systems may be integrated into the one or more sealant injection assemblies 200.

In some embodiments, the hole 104 may be formed by cold drilling the trap door 100 to have the hole 104 extending from the first surface 105 of the trap door 100 to the second surface 106 of the trap door 100. The hole 104 may be cold drilled at the site or added during design and machined as part of the typical manufacturing process.

Still referring to FIG. 2, the trap door 100 includes a seal 109 within a circumferential groove 110 about the second surface 106 of the trap door 100 proximate an outer circumference 111. The seal 109 may be made from a rubber material, such as hydrogenated nitrile butadiene rubber (HNBR), and have any configuration to form a seal between the second surface 106 of the trap door 100 and an interfacing surface 7 of the rim 3. For example, the seal 109 may be an O-ring seal, an energized seal, or other seal. It is further envisioned that the seal 109 may include an anti-extrusion ring.

In one or more embodiments, one or more grooves 300 is provided to receive sealant compounds 301 from the injection fitting 201. The one or more grooves 300 may be added by the process of cold drilling at the site or during design and machining as part of the typical manufacturing process of the trap door 100. For example, the one or more grooves 300 may be spaced 2 to 3 inches from the seal 109. As shown in FIG. 2, the one or more grooves 300 extends a depth into the trap door 100 from the second surface 106 at an end of the hole 104 and interface with the interior (e.g., bore 6) of the scraper launcher 1 when the trap door 100 is in the closed position. The one or more grooves 300 may be radially spaced from the seal 109 at a location further from the outer circumference 111 than the seal 109. In other words, the circumferential groove 110 holding the seal 109 may be formed around a radial distance from the center of the trap door 100 that is greater than the radial distance the groove(s) 300 are formed around. Once injected, the sealant compounds 301 fill the one or more grooves 300 and forms a barrier to block fluids from leaking out of the trap door 100. For example, fluids will be blocked by the sealant compounds 301 in the one or more grooves 300 from flowing past the interfacing surface 7 and out of the scraper launcher 1 into the surrounding environment.

Figure 3:
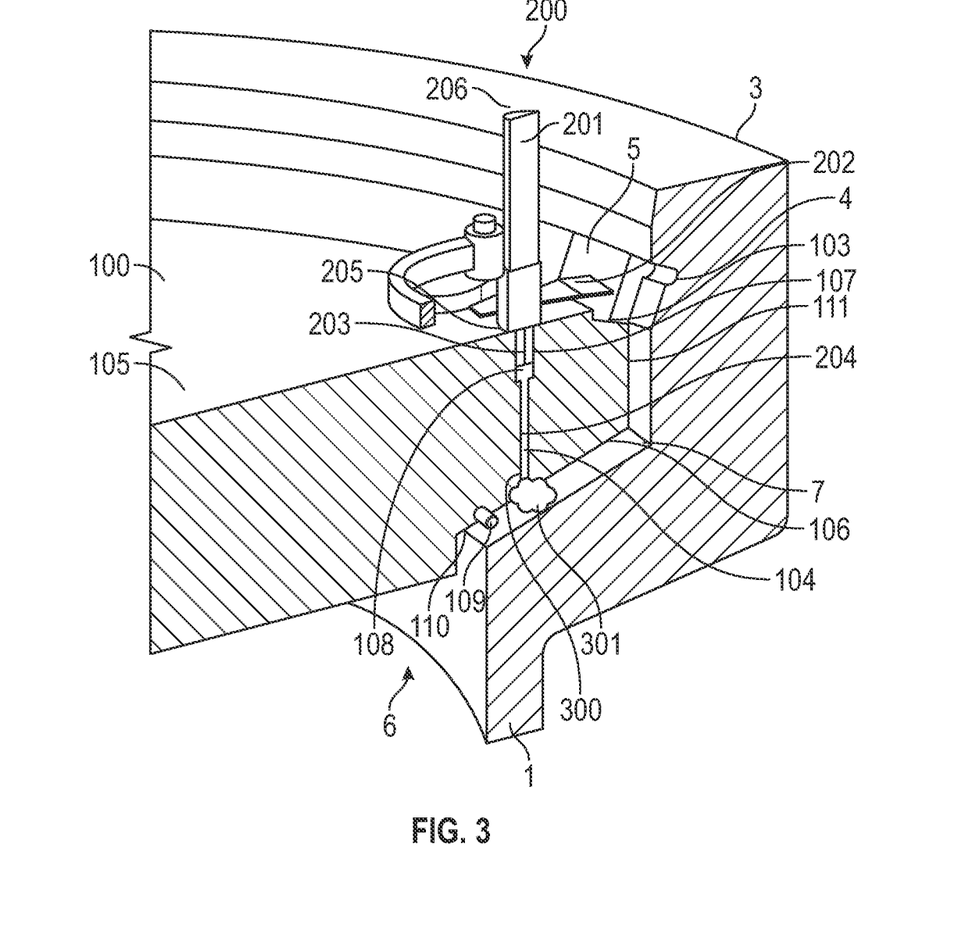

FIG. 3 shows another example of a trap door having one or more grooves formed along its interior surface according to embodiments. The embodiment of FIG. 3 is similar to that of the embodiment of FIG. 2. However, instead of the one or more grooves 300 being at a location further from the outer circumference 111 than the seal 109, the seal 109 is further from the outer circumference 111 than the one or more grooves 300. In such embodiment, the groove(s) 300 may axially overlap with the interfacing surface 7 of the rim 3 when the trap door 100 is closed against the rim 3.

Figure 4:
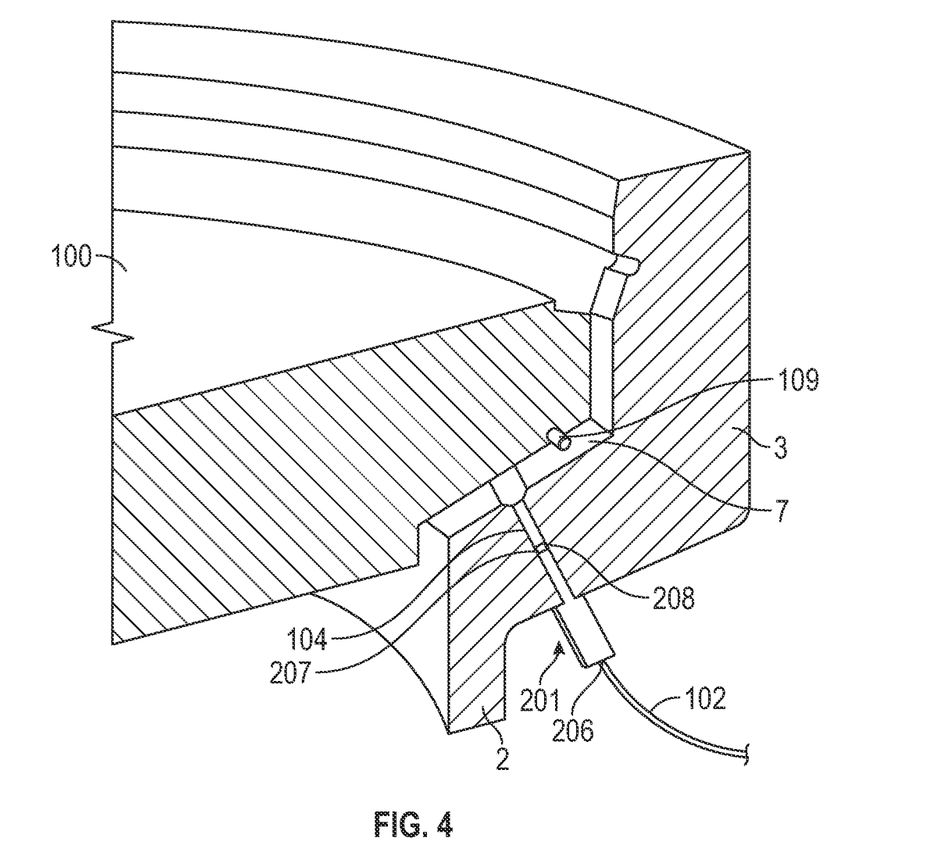
FIG. 4 is a perspective cross-sectional view of a scraper launcher according to embodiments of the present disclosure.

FIG. 4 shows another example of a scraper launcher 1 according to embodiments of the present disclosure. The embodiment of FIG. 4 is similar to that of the embodiment of FIG. 2. However, instead of a sealant injection system being integrated with the trap door 100, a sealant injection system may be integrated with the scraper launcher body 2, e.g., through a rim 3 portion of the scraper launcher.

For example, as shown in FIG. 4, a hole 104 may be formed through the scraper launcher body 2 (e.g., through the rim 3 portion of the scraper launcher body), where the hole 104 may extend between an exterior of the scraper launcher and the interfacing surface 7 of the rim 3. Although FIG. 4 shows a linear hole 104 formed through the scraper launcher, in some embodiments, a curved or multi-directional sealant passage may be formed through the scraper launcher.

An injection fitting 201 may be inserted partially into the hole 104, such that an injection end 208 of the injection fitting 201 interfaces with the hole 104, and a portion of the injection fitting 201 extends outwardly from the scraper launcher body 2. The injection fitting 201 may be connected to the hole 4 (e.g., via a threaded connection) and/or may be connected to the exterior of the scraper launcher body 2 (e.g., using a locking mechanism, welding, bolts, or other attachment mechanism). A hose 102 may be connected to a hose connection end 206 of the injection fitting 201, which may direct a sealant compound from a sealant compound source to the hole 104.

The hole 104 may interface or be fluidly connected to one or more grooves 300 formed along the interface between the trap door 100 and the scraper launcher body 2. For example, in the embodiment shown, one or more grooves 300 may be provided on the interfacing surface 7 of the scraper launcher body 2, below the trap door 100 when the trap door is closed. A sealant compound may be directed from the injection fitting 201 through the hole 104 to fill the groove 300 between the trap door 100 and scraper launcher body 2 interface. A check valve 207 may be provided in the injection fitting (e.g., at an injection end 208 of the injection fitting or between the injection and connection ends of the injection fitting).to prevent backflow of the sealant compound after injection.

The groove 300 may be extend around the entire interface between the trap door 100 and scraper launcher body 2, such that the groove 300 may enclose an area of the trap door. Additionally, as shown in the embodiment in FIG. 4, the groove 300 may be positioned radially inward from a seal 109 positioned between the trap door and scraper launcher body. In some embodiments, the groove 300 may be positioned radially outward from the seal 109. In some embodiments, more than one groove 300 may be provided, where one groove is radially inward from a seal and another groove is radially outward from the seal.

Figure 5:
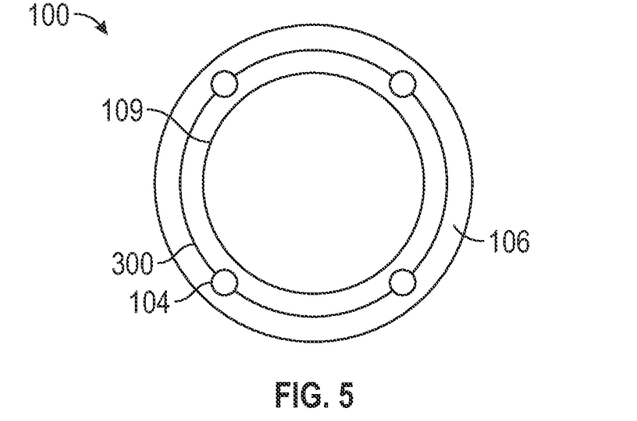
FIGS. 5-7 are bottom views of the trap door in accordance with one or more embodiments of the present disclosure.

Now referring to FIG. 5, a back view of the trap door 100 is illustrated to show the second surface 106 (interior facing surface when the trap door is closed) in accordance with one or more embodiments of the present disclosure. The one or more grooves 300 and the seal 109 may each extend around the second surface 106 of the trap door to fully enclose an area of the second surface 106. The groove(s) 300 and the seal 109 may be coaxially positioned along the trap door 100 to be evenly spaced apart. In FIG. 5, the groove 300 has a larger diameter than the seal 109. Further, holes 104 may be evenly spaced about the groove 300 to evenly distribute a sealant compound through the groove 300 and form a barrier around the full circumference of the groove 300.

Figure 6:
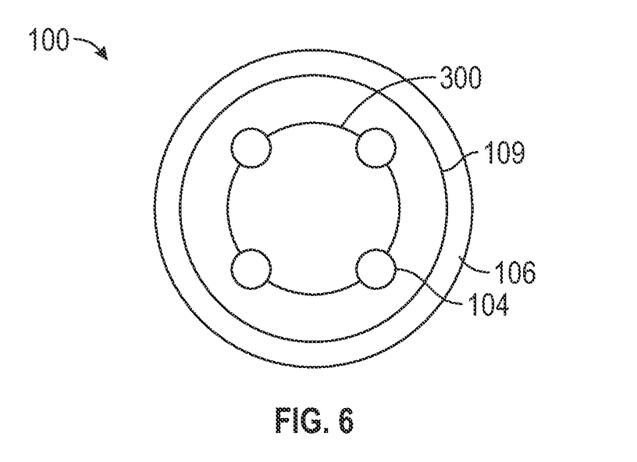

FIG. 6 shows another example of a trap door 100, viewed along its interior, second surface 106, having a seal 109 concentrically positioned around a groove 300 formed along the second surface 106. In the embodiment shown, the seal 109 has a larger diameter than the groove 300.

Figure 7:
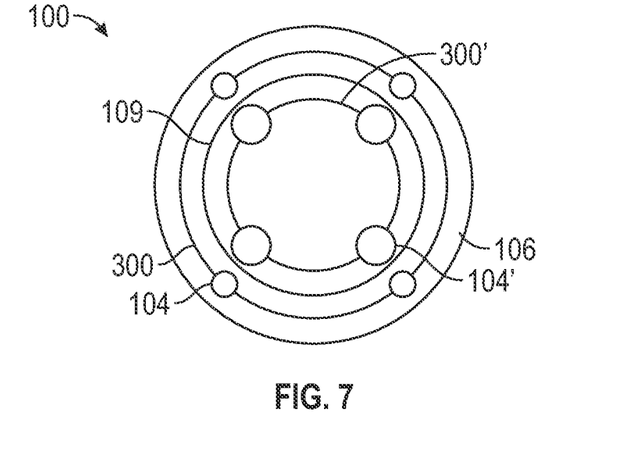

FIG. 7 shows another example of a trap door 100, viewed along its interior, second surface 106, having circular grooves 300 and a seal 109 provided along the second surface 106. In FIG. 7, the trap door 100 may have two grooves 300, 300' each with corresponding holes 104, 104' to provide two sealant compound barriers. When multiple grooves 300 are formed in the second surface 106, the grooves 300 may be provided both inside and outside of the seal 109 (e.g., at least one groove having a larger diameter and at least one groove having a smaller diameter than the seal 109), such as shown in FIG. 7, or the grooves 300 may be provided only on one side of the seal 109 (e.g., each groove having a diameter smaller than the seal or each groove having a diameter larger than the seal).

Figure 8:
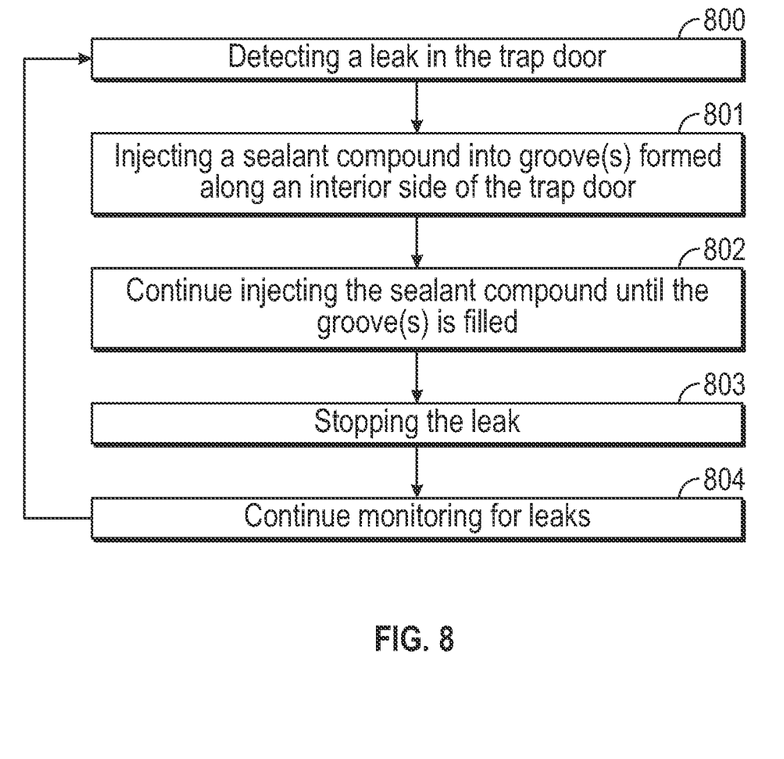
FIG. 8 illustrates a flowchart in accordance with one or more embodiments.

Referring to FIG. 8, FIG. 8 illustrates a flowchart for utilization of a sealant injection system 200. One or more steps in FIG. 8 may be performed by one or more components as described in FIGS. 1-7. For example, a computing system may be coupled to a controller in communication with the sealant injection system. The computing system may include a non-transitory computer readable medium that may store instructions on a memory coupled to a processor, where the instructions include functionality for operating the sealant injection system 200. The computer system may encompass any computing device such as a high-performance computing (HPC) device, a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer system may include a computer that includes an input device, such as a keypad, keyboard, touch screen, or other device that can accept user information, and an output device that conveys information associated with the operation of the computer system, including digital data, visual, or audio information (or a combination of information), or a GUI.

In step 800, a leak of fluid through the interface between the trap door and body of a scrapper launcher may be detected. For example, a sensor may take pressure or flow rate measurements to determine if a leak has occurred. Additionally, the sensor may also detect the leak by hearing a sound of the fluid exiting the trap door or sense an odor of the fluid. Further, an alert or alarm may be sent to an operator to indicate the leak of fluids has been detected.

In step 801, once the leak is detected, a sealant compound may be injected to one or more grooves formed between the interface between the trap door and body of the scraper launcher (e.g., a groove formed along the interior surface of the trap door and/or a groove formed along the interfacing surface of the scraper launcher body). For example, a pump may flow the sealant compound through hoses into injection fitting(s) of the sealant injection system. From the injection fitting(s), the sealant compound may flow through sealant passages (e.g., hole(s) 104) formed through the trap door or through the scraper launcher body to enter the one or more grooves.

In step 802, the pump may continue to inject the sealant compound until the one or more grooves are filled to form a barrier to stop the leak. For example, the groove(s) may completely enclose an interior area of the trap door, such that when the groove(s) are filled, a barrier of the sealant is formed to prevent fluids from escaping the enclosed interior area of the trap door. In some embodiments, when a groove is filled, the sealant compound may overflow to protrude out of the groove.

In step 803, the formed sealant compound barrier may stop the fluid from continuing to leak. For example, the formed sealant compound barrier may keep any fluids, such as hydrocarbons, from exiting the pipeline from the trap door.

In step 804, with the leak stopped, the system may continue to monitor for leaks. From step 804, the method may restart at step 800 if another leak is detected. Additionally, if required, repairs and maintenance operations may be conducted on the trap door while continuing to monitor for leaks. For example, the formed sealant compound barrier may continue to block fluids from leaking such that repairs may be conducted on the seal.

In addition to the benefits described above, the sealant injection system for a trap door disclosed herein may improve an overall efficiency and performance of cleaning operation in a pipeline while reducing cost. Additionally, the sealant injection system may seal external leaks from trap doors instantly, allow immediate release control of hydrocarbons from the trap door, and provide sufficient time to contain and approach the leak while preventing exposure of toxic materials to the workforce and environment. Further, a sealant injection system as described herein may provide further advantages such as reducing product engineering, assembly time, hardware cost reduction, and weight and envelope of the trap door.

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the disclosure should be limited only by the attached claims.

What is claimed:

1. A scraper launcher, comprising:
   a body comprising a rim;
   a trap door having a first surface and a second surface, opposite the first surface, wherein an interfacing portion of the second surface interfaces with an interfacing surface of the rim when the trap door is closed against the rim;
   a seal provided between the interfacing portion of the trap door and the interfacing surface of the rim; and
   a sealant injection system, wherein the sealant injection system comprises:
     sealant passages formed through the scraper launcher, fluidly communicating an exterior of the scraper launcher to an interior of the scraper launcher; and
     an injection fitting in communication with the sealant passages.

2. The scraper launcher of claim 1, wherein the sealant passages comprise:
   a groove formed along the second surface; and
   a hole formed through the trap door, extending from the first surface to the second surface;
   wherein the hole is in fluid communication with the groove.

3. The scraper launcher of claim 1, wherein the sealant passages comprise:
   a groove formed along the second surface; and
   a hole formed through the body of the scraper launcher;
   wherein the hole is in fluid communication with the groove.

4. The scraper launcher of claim 1, wherein the sealant passages comprise a groove formed along an inner surface of the body.

5. The scraper launcher of claim 1, wherein the sealant passages comprise a groove formed between the interfacing portion of the trap door second surface and the interfacing surface of the rim.

6. The scraper launcher of claim 1, wherein the sealant injection system further comprises at least one additional injection fitting in communication with the sealant passages.

7. The scraper launcher of claim 1, wherein the injection fitting comprises a check valve.

8. A trap door of a scraper launcher comprising:
   a first surface;
   a second surface, opposite the first surface, wherein a thickness of the trap door is measured between the first surface and the second surface;
   a seal disposed within a circumferential groove formed around the second surface;
   a hole formed through the thickness of the trap door, extending from the first surface to the second surface;
   an injection fitting coupled to the hole; and
   a groove extending a depth into the trap door from the second surface, wherein the hole is in fluid communication with the groove.

9. The trap door of claim 8, wherein the groove is at a location radially closer to an outer circumference of the trap door than a radial location of the seal.

10. The trap door of claim 8, wherein the groove is at a location radially further from an outer circumference of the trap door than a radial location of the seal.

11. The trap door of claim 8, wherein the groove and the seal are coaxial.

12. The trap door of claim 8, further comprising a pump fluidly coupled between the injection fittings via hoses and a sealant compound source.

13. The trap door of claim 12, wherein the sealant compound source comprises polytetrafluoroethylene.

14. The trap door of claim 8, wherein a threaded portion of the injection fitting is coupled to a threaded portion of the hole to have a nozzle of the injection fitting disposed within the hole.

15. The trap door of claim 8, wherein the seal comprises an O-ring and an anti-extrusion ring.

16. A method comprising:
    detecting a leak of fluids from a trap door of a scraper launcher;
    injecting a sealant compound, with an injection fitting, into a groove formed along an interface between the trap door and a body of the scraper launcher; and
    stopping the leak of fluids with a barrier formed from the injected sealant compound.

17. The method of claim 16, wherein stopping the leak of fluids comprises:
    filling the groove with the sealant compound; and
    overfilling the groove with the sealant compound to protrude the sealant compound out of the groove.

18. The method of claim 16, further comprising pumping the sealant compound from a pump to the injection fitting via hoses.

19. The method of claim 16, wherein detecting the leak of fluids comprises:
   measuring, with a sensor, a pressure or flow rate of the fluids at the trap door; and
   sending an alert once the leak of fluids is detected.

20. The method of claim 16, further comprising continuously monitoring for a second leak after the leak of fluids is stopped.

\* \* \* \* \*